No. 874,041.
PATENTED DEC. 17, 1907.
T. SUZUKI.
APPARATUS FOR BREWING SOY.
APPLICATION FILED JULY 18, 1907.
2 SHEETS—SHEET 1.
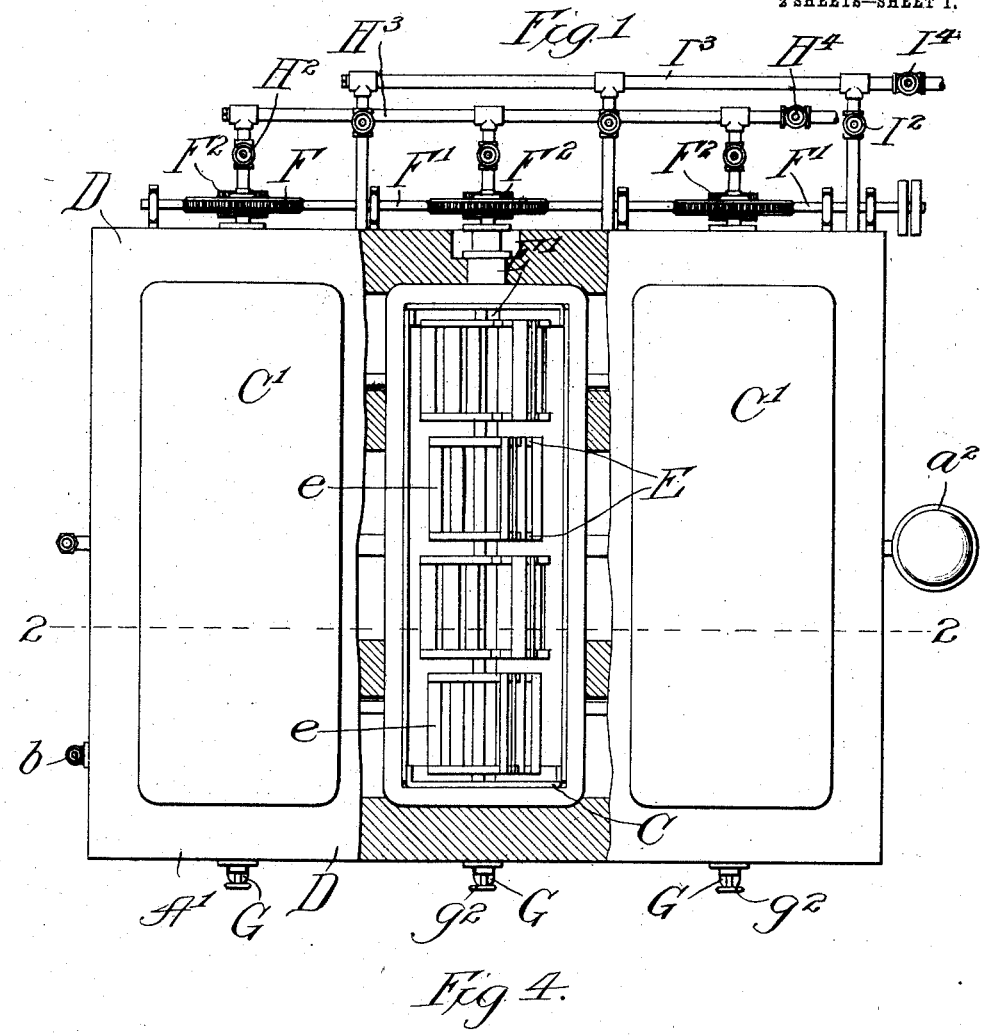
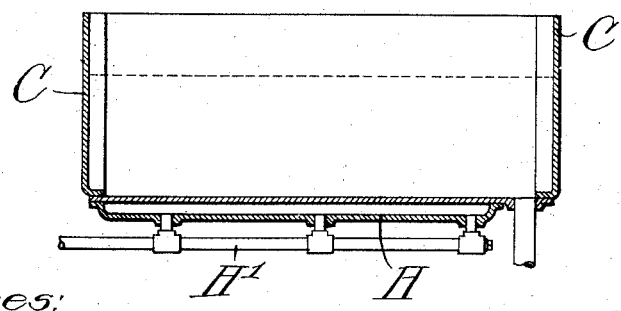
Witnesses:
L. Waldman
C. Heymann
Inventor:
Tozaburo Suzuki,
By B. Singer
Atty.

No. 874,041.

PATENTED DEC. 17, 1907.

T. SUZUKI.
APPARATUS FOR BREWING SOY.
APPLICATION FILED JULY 18, 1907.

2 SHEETS—SHEET 2.

Witnesses:
L. Waldman
C. Heymann

Inventor:
Tozaburo Suzuki,
By B. Singer
Atty.

UNITED STATES PATENT OFFICE.

TOZABURO SUZUKI, OF SUNAMURA, JAPAN.

APPARATUS FOR BREWING SOY.

No. 874,041.  Specification of Letters Patent.  Patented Dec. 17, 1907.

Application filed July 18, 1907. Serial No. 384,389.

To all whom it may concern:

Be it known that I, TOZABURO SUZUKI, a subject of the Emperor of Japan, residing at Sunamura, Province of Tokio, Empire of Japan, have invented certain new and useful Improvements in Apparatus for Brewing Soy, of which the following is a specification.

This invention relates to improvements in apparatus for brewing soy and is especially adapted for use in connection with the apparatus disclosed in my patent dated May 9, 1905, Serial Number 789,299. In my former invention disclosed in said patent a plurality of tanks or receptacles were employed for receiving the soy and said tanks were sunk into a closed chamber wherein means were provided for regulating the temperature. Stirring apparatus was provided for effecting continuous and uniform agitation of the contents of the tanks.

The object of this improvement is to provide auxiliary means for quickly changing the temperature of the tanks, said means being also adapted to act as a substitute for the closed chamber for effecting or giving the contents of the tanks a uniform temperature and also acting if desired in conjunction with said chamber for regulating the temperature of said tanks. In the brewing of soy the question of temperature is very important and it very often happens that by accident the temperature varies one way or the other from the normal, in which case it is important to quickly restore the normal or required temperature as otherwise the material would be either wholly ruined or seriously impaired as to its quality.

A further utility of the invention consists in providing means whereby hot water or a like heating medium may be directed through the auxiliary means to facilitate and hasten first maturing by heating the mash and whereby after the first maturing is completed cold water or a like cooling medium may be circulated through the auxiliary means to complete second maturing of the soy.

The invention will be more fully described in connection with the accompanying drawings and will be more particularly pointed out and ascertained in and by the appended claims.

Figure 2:
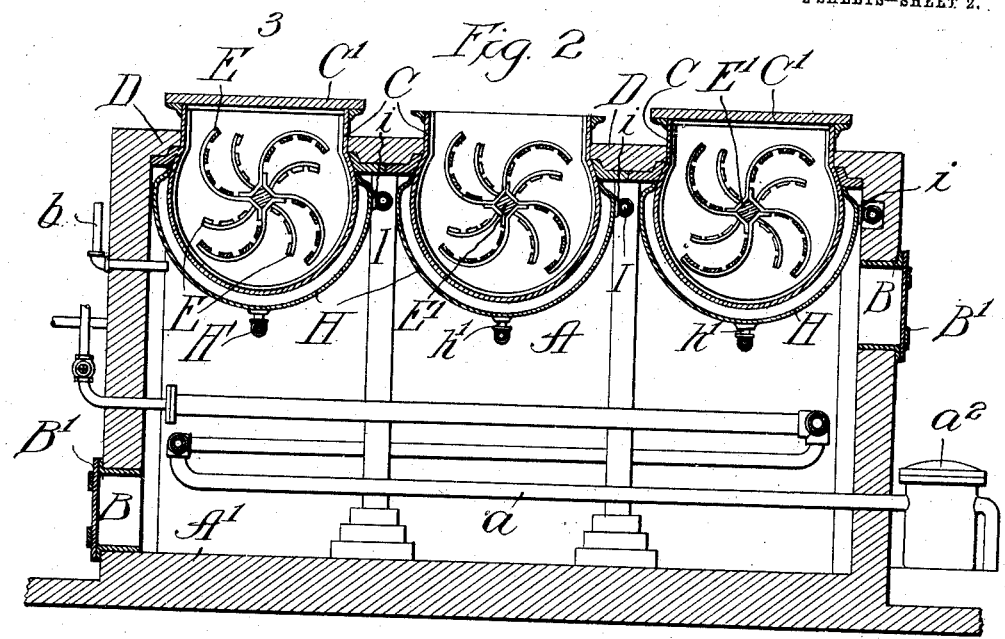
Figure 3:
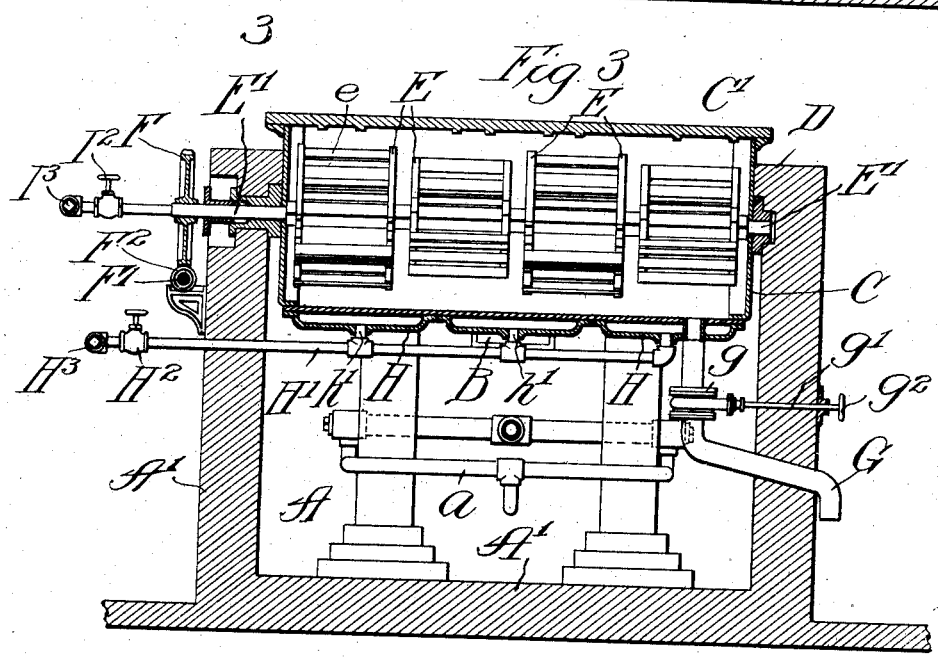

In the drawings:—Figure 1 is a plan view of a device to which my invention may be applied showing parts broken away. Fig. 2 is a sectional view on line 2—2 of Fig. 1. Fig. 3 is a sectional view on line 3—3 of Fig. 2. Fig. 4 is a detail section of a modified form of tank.

Like characters of reference designate similar parts throughout the different figures of the drawings.

In the accompanying drawings one specific embodiment of the invention will be described but it will be understood that the invention is not to be limited by this specific disclosure except for such limitations as the claims impart.

A closed heating chamber A is formed by a structure A' which chamber may be maintained at a uniform temperature by passing steam or the like through a convoluted pipe $a$ provided with a regulating valve $a'$, a steam trap $a^2$ being conveniently located outside the chamber. The structure A' is provided with ventilating ports B closed by doors B' through which cool air may be admitted should the thermometer $b$ indicate too great a temperature, said ports also permitting a reduction of temperature when open subsequent to the heating period or in other words when a lower temperature is desired.

A plurality of tanks C are suitably mounted in the upper wall D of the structure A' said tanks projecting or being sunk into the chamber A in order that their contents may be influenced by the tempreature of said chamber. Said tanks are preferably disposed in parallel relation and are suitably spaced apart in a manner to expose an area of their surface equal to the normal containing capacity of said tanks to the action of the air or other heating medium contained in the chamber A. Said tanks are advisably provided with covers C' to prevent their contents from being affected by outside atmospheric conditions. Draw-off pipes G connect with the bottoms of said tanks and preferably extend outwardly through the structure A', said pipes being provided with valves $g$ located adjacent the tanks and having their valve stems $g'$ extending through the structure A' and adapted to be operated from the exterior thereof by suitable devices for instance such as hand wheels $g^2$.

In apparatus of this nature it is essential to provide means adapted not only to effect continuous agitation of the contents of the tanks during the brewing process but also to change the position of the contents so that the same will be subjected to the heating or cooling influences as nearly uniformly as possible. To this end stirring apparatus is employed which consists of a plurality of pairs of radial stirring arms E for each tank adapted to be mounted upon centrally disposed shafts E'. In cases such as that shown wherein a plurality of tanks are employed it is desirable and advantageous to operate the several stirring apparatus from a single source of power and to this end the shafts E' are provided with worm wheels F and a main operating shaft F' is provided having worms F² meshing with said worm wheels. At one end of said shaft fast and loose pulleys are provided whereby power may be applied from any convenient source.

Referring more particularly to the stirring apparatus the pairs of arms E are connected by transverse slats e and adjacent pairs of arms as will be seen by reference to Fig. 3 are spaced apart from each other and are of different radial length; further adjacent pairs of arms are arranged on the shafts in a manner to bring said pairs out of alinement with each other. By means of this construction and arrangement the contents of a tank engaged by the slats of one pair of arms will be thrust laterally in opposite directions into the paths of slats of adjacent arms and vice versa thereby effecting movement of the contents of the tank longitudinally thereof in reverse directions.

While the foregoing apparatus has been found to be highly efficient, practical working, has demonstrated the need of means for quickly changing the temperature of the contents of the tank. It will be understood that some time would elapse, for instance, after an excessive temperature had been reached, before such temperature could be lowered by opening the ports B. Furthermore in warm climates it would be necessary to supply a cold blast through the ports B to obtain the required decrease in temperature. This difficulty was found to be still more acute and troublesome at stages of the brewing process where it is desired to lower the temperature at the end of the heating period and to provide a sufficiently low temperature to effect second maturation. To this end auxiliary means are associated with the hereinbefore described apparatus for not only quickly restoring a normal temperature when a lower or a higher temperature has been accidentally or otherwise created but for effecting an extreme change of temperature at the termination of the first maturing of the mash for the purpose of obtaining second maturing. The said auxiliary means is associated with the tanks, in the preferred construction, in such a manner as to perform its functions independently of the heating chamber, when in operation, and said means also permits the operation of the heating chamber under normal conditions. As shown said auxiliary means consists of jackets H extending about the lower portions of the tanks C to points adjacent the upper wall D. Said jackets H are preferably spaced apart from each other longitudinally of the tanks, a sufficient distance to permit anchorage to the tanks at $h$, the disposition being such as to inclose substantially the entire containing capacity of the tanks so that the same subjected to the influence of cooling or heating mediums passes through the jackets H. As shown in Fig. 4 the jacket $H^8$ extends throughout the length of the tank and for some conditions this form has decided advantages. Pipes H' or other suitable means are provided to admit a cooling or heating agent to said jackets, said pipes connecting with and delivering to the jackets through the medium of branches $h'$.

If desired the pipes H' may constitute means for delivering and discharging the cooling or heating medium or I may provide pipes I delivering to the jackets by branches $i$ for supplying the cooling or heating medium and utilize pipes H' for permitting discharge from the jackets H. Said pipes I and H' may be provided with suitable valves $H^2$ and $I^2$ for controlling the supply of the cooling or heating medium said valves being located outside the structure A'. As shown manifold supply pipes $H^3$ and $I^3$ are connected with valves $H^2$ and $I^2$ respectively and are provided with valves $H^4$ and $I^4$. It will be obvious that when the jackets are empty the temperature of the tanks may be readily controlled from the heating chamber A and it will likewise be obvious that when the jackets are filled they form an insulating wall or partition effectively preventing the chamber A from influencing or in any way changing the temperature of the contents of the tank. The particular construction of stirring arms hereinbefore set forth is particularly advantageous in effecting a quick change of temperature in connection with my improved device, in view of the fact that said stirring apparatus not only agitates the material or contents of the tank but it effects longitudinal movement of the material in said tanks in reverse directions which agitation serves to uniformly and to the greatest possible extent quickly bring the entire contents of the tanks into engagement with the walls of the same in such a manner as to permit the heating or cooling medium in the jackets to quickly, thoroughly and uniformly act upon the contents of the tanks to change the temperature thereof. While it will be understood that the improvement constituting this invention is not to be limited to the particular form of apparatus set forth in my prior patent hereinbefore identified nevertheless the application of this improved invention to the specific form of the patented device obtains results which cannot otherwise be obtained by any other form of apparatus known to me.

I claim:—

1. The combination with a closed heating chamber provided with ventilated ports, doors for said ports, heating coils for said chamber, one or more brewing tanks sunk within said chamber, draw-off pipes connected with said tanks and passing outwardly through the wall of said chamber, valves for said pipes, jacketed bottoms for said tanks, ingress and egress means for heating and cooling medium, stirring shafts passing centrally through said tanks, a plurality of stirrers mounted on said shaft, each stirrer comprising a plurality of pairs of radial stirring arms connected by transverse stirring slats, the arms of adjacent stirrers being of different radial lengths, the stirrers being separated from each other and the tank by relatively short intervals of space and arranged upon the shafts to bring the arms and slots of adjacent stirrers out of alinement thereby serving alternately to thrust the soy from the path of one stirrer laterally into the paths of adjacent stirrers.

2. The combination with a closed heating chamber, means for regulating the temperature of said chamber, one or more brewing tanks sunk in said chamber in a manner to be influenced by the temperature thereof, auxiliary means associated with the tanks for quickly changing the temperature of the contents thereof, means for admitting and discharging heating or cooling fluid to said auxiliary means, stirring shafts passing centrally through said tanks, stirrers mounted on said shafts, each stirrer comprising radial stirring arms connected by transverse slats, the arms of adjacent stirrers being of different radial length, the stirrers being separated from each other by relatively short intervals of space and arranged upon the shaft to bring the arms and slats of adjacent stirrers out of alinement thereby serving to alternately thrust the soy from the path of one stirrer laterally into the paths of the adjacent stirrers.

3. The combination with a closed heating chamber, means for regulating the temperature of said chamber, one or more brewing tanks sunk in said chamber and subjected to the temperature therein, auxiliary means for changing the temperature in said tanks, stirring shafts passing centrally through said tanks, stirrers mounted on said shafts, each stirrer comprising a plurality of pairs of radial stirring arms connected by transverse slats and arranged upon the shafts to bring the arms and slats of adjacent stirrers out of alinement thereby serving to alternately thrust the soy from the path of one stirrer laterally into the paths of adjacent stirrers.

4. The combination with one or more brewing tanks, means for applying a constant heat thereto, auxiliary means for quickly changing the temperature thereof, shafts for said tanks, and a plurality of stirrers mounted on said shafts out of alinement with each other thereby serving to alternately thrust the soy from the path of one stirrer laterally into the paths of adjacent stirrers.

In testimony whereof I affix my signature in presence of two witnesses.

TOZABURO SUZUKI.

Witnesses:
H. F. HAWLEY,
YASUNDUKE FUKUKITA.